(12) United States Patent
Zhang et al.

(10) Patent No.: US 6,201,613 B1
(45) Date of Patent: Mar. 13, 2001

(54) AUTOMATIC IMAGE ENHANCEMENT OF HALFTONE AND CONTINUOUS TONE IMAGES

(75) Inventors: Yeqing Zhang, Penfield; Jeng-nan Shiau, Webster; Martin Edward Banton, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/120,331

(22) Filed: Jul. 22, 1998

(51) Int. Cl.$^7$ .............................. G06K 9/40; G06K 9/46; G06T 5/00; G06T 7/00; H04N 1/409
(52) U.S. Cl. ........................ 358/1.9; 358/458; 382/254; 382/264; 382/205
(58) Field of Search ..................... 382/260, 264, 382/266, 274, 254, 237, 270, 205; 358/455, 456, 458, 447, 1.9, 298

(56) References Cited

U.S. PATENT DOCUMENTS

| | | |
|---|---|---|
| 5,001,573 * | 3/1991 | Sakamoto et al. ............... 358/447 |
| 5,045,952 | 9/1991 | Eschbach . |
| 5,239,390 * | 8/1993 | Tai ..................................... 358/458 |
| 5,341,226 * | 8/1994 | Shiau et al. ....................... 358/518 |
| 5,343,309 * | 8/1994 | Roetling ............................ 358/455 |
| 5,347,374 | 9/1994 | Fuss et al. . |
| 5,357,352 | 10/1994 | Eschbach . |
| 5,363,209 | 11/1994 | Eschbach et al. . |
| 5,371,615 | 12/1994 | Eschbach . |
| 5,414,538 | 5/1995 | Eschbach . |
| 5,450,217 | 9/1995 | Eschbach et al. . |
| 5,450,502 | 9/1995 | Eschbach et al. . |
| 5,483,603 * | 1/1996 | Luke et al. ........................ 382/147 |
| 5,581,370 | 12/1996 | Fuss et al. . |
| 5,852,678 * | 12/1998 | Shiau et al. ....................... 382/176 |

* cited by examiner

Primary Examiner—Scott Rogers
(74) Attorney, Agent, or Firm—Oliff & Berridge, PLC

(57) ABSTRACT

Automatic image enhancement of halftone images is performed by subjecting the halftone image to a low-pass filter so as to smooth out halftone variations between adjacent pixels prior to performing conventional image analysis and image processing.

29 Claims, 10 Drawing Sheets

|   |   |   |    |    |   |   |
|---|---|---|----|----|---|---|
| 1 | 2 | 3 | 4  | 3  | 2 | 1 |
| 2 | 4 | 6 | 8  | 6  | 4 | 2 |
| 3 | 6 | 9 | 12 | 9  | 6 | 3 |
| 4 | 8 | 12| 16 | 12 | 8 | 4 |
| 3 | 6 | 9 | 12 | 9  | 6 | 3 |
| 2 | 4 | 6 | 8  | 6  | 4 | 2 |
| 1 | 2 | 3 | 4  | 3  | 2 | 1 |

300

|     | (A) | (B) | (C) | (D) | (E) | (F) | (G) | (H) | (I) |
|-----|-----|-----|-----|-----|-----|-----|-----|-----|-----|
| (1) | 234 | 220 | 150 | 50  | 0   | 0   | 0   | 50  | 50  |
| (2) | 220 | 210 | 75  | 25  | 0   | 0   | 0   | 0   | 25  |
| (3) | 10  | 20  | 20  | 0   | 0   | 5   | 0   | 0   | 0   |
| (4) | 26  | 10  | 50  | 180 | 75  | 13  | 5   | 0   | 5   |
| (5) | 75  | 5   | 0   | 25  | 0   | 35  | 15  | 5   | 5   |
| (6) | 150 | 50  | 50  | 150 | 80  | 56  | 15  | 5   | 50  |
| (7) | 225 | 140 | 85  | 180 | 234 | 35  | 15  | 10  | 50  |
| (8) | 100 | 50  | 85  | 160 | 240 | 160 | 15  | 10  | 50  |
| (9) | 15  | 20  | 100 | 255 | 255 | 150 | 35  | 15  | 150 |

310 pixel (D)(4)

| 234 | 440 | 450 | 200 | 0 | 0 |
|---|---|---|---|---|---|
| 440 | 840 | 450 | 200 | 0 | 0 |
| 30 | 120 | 180 | 0 | 0 | 0 |
| 104 | 80 | 600 | 2880 | 900 | 30 |
| 225 | 30 | 0 | 300 | 0 | 104 |
| 300 | 200 | 300 | 1200 | 480 | 210 |
| 225 | 280 | 255 | 720 | 702 | 224 |
| | | | | | 70 |

(additional column: 20, 45, 30, 15)

FIGURE 6 pixel (H)(1)

| 234 | 440 | 30 | 104 | 250 | 150 | 245 | 400 | 70 | 300 | 1275 | 640 | 765 | 70 | 56 |

FIGURE 13

|     | (A) | (B) | (C) | (D) | (E) | (F) | (G) | (H) | (I) |
|-----|-----|-----|-----|-----|-----|-----|-----|-----|-----|
| (1) |     |     |     |     |     |     |     |     |     |
| (2) |     |     |     |     |     |     |     |     | 320 |
| (3) |     |     |     |     |     |     |     |     |     |
| (4) |     |     |     | 55  | 42  | 30  |     |     |     |
| (5) |     |     |     | 65  | 54  | 42  |     |     |     |
| (6) |     |     |     | 87  | 78  | 63  |     |     |     |
| (7) |     |     |     |     |     |     |     |     |     |
| (8) |     |     |     |     |     |     |     |     |     |
| (9) |     |     |     |     |     |     |     |     |     |

|  | (A) | (B) | (C) | (D) | (E) | (F) | (G) | (H) | (I) | (J) | (K) | (L) | (M) | (N) | (O) | (P) | (Q) | (R) |
|---|---|---|---|---|---|---|---|---|---|---|---|---|---|---|---|---|---|---|
| (1) | 234 | 220 | 10 | 26 | 50 | 25 | 35 | 50 | 10 | 50 | 255 | 160 | 255 | 35 | 56 | 35 | 160 | 100 |
| (2) | 220 | 210 | 20 | 10 | 0 | 0 | 50 | 75 | 0 | 30 | 234 | 240 | 255 | 100 | 15 | 15 | 15 | 25 |
| (3) | 150 | 75 | 20 | 50 | 0 | 0 | 5 | 13 | 35 | 56 | 35 | 160 | 150 | 5 | 5 | 10 | 10 | 30 |
| (4) | 200 | 150 | 50 | 75 | 50 | 40 | 35 | 50 | 75 | 100 | 20 | 10 | 100 | 80 | 80 | 100 | 120 | 130 |

4 X 18 pixel area — 410

(sum of (((filter weight) X (pixel value)))/64

|     | (H) | (I) | (J) | (K) 420 |
|-----|-----|-----|-----|-----|
| (1) | 79  | 82  | 91  | 103 |
| (2) | 78  | 83  | 91  | 102 |
| (3) | 40  | 42  | 46  | 49  |
| (4) | 61  | 59  | 61  | 63  |

AUTOMATIC IMAGE ENHANCEMENT OF HALFTONE AND CONTINUOUS TONE IMAGES

BACKGROUND OF THE INVENTION

1. Field of Invention

The invention relates to the field of image processing. In particular, the invention relates to automatic image enhancement of halftone and continuous tone images.

2. Description of Related Art

Automatic image enhancement (AIE) is a technology that operates on sampled images and invokes image processing operations on the sampled images based on analysis of the images. Automatic image enhancement automatically corrects image deficiencies through adjustments of exposure, contrast, sharpness, color balance and saturation. After analysis of the image is performed to determine what action, if any, to perform on the image, the appropriate image processing is applied to the image. In the past, automatic image enhancement was done almost exclusively on continuous tone (contone) images, such as photographs.

SUMMARY OF THE INVENTION

In the office environment, it is much more likely to encounter a halftone original than a contone original. Halftone originals are often degraded when scanned or reproduced, for example, by photocopying.

This invention provides a system and method for automatically enhancing degraded halftone images as effectively as degraded contone images can be enhanced.

This invention provides a system and method that automatically enhances halftone images using a spatial filter.

This invention provides a low-pass spatial filter as the spatial filter.

This invention provides a pyramid filter as a two-dimensional embodiment of the spatial filter.

This invention provides a triangular filter as a one-dimensional embodiment of the spatial filter.

Due to the human eye's inability to individually resolve the pixels of a halftone image at normal viewing distance, a halftone image appears to have tone gradations like a contone image. However, pixel-by-pixel analysis, or statistics collection, of the halftone image may produce a different result than the same pixel-by-pixel analysis of a similarly-degraded contone image. This difference usually produces disappointing results when automatic image enhancement is applied to a degraded halftone image.

To avoid the disappointing results of applying automatic image enhancement to a degraded halftone image, the system and method of this invention smooth the scanned halftone image using a low-pass spatial filter prior to collecting statistics, to obtain more accurate information about the scanned halftone image. Although many low-pass spatial filter configurations will improve conventional automatic image enhancement methods, a 7×7 two-dimensional pyramid low-pass filter is an example of a low-pass spatial filter which provides satisfactory results. A 15×1 one-dimensional triangular lowpass filter can also be used in the invention. Compared to two-dimensional filtering, one-dimensional filtering is less expensive since it does not need scan line buffers to store multiple scan line image data. Using a 15×1 one-dimensional filter in the invention provides acceptable results so that it is preferable in a cost sensitive application.

By applying the low-pass spatial filter to the scanned halftone image, the image density of each pixel is adjusted to eliminate large image density differences between adjacent pixels. As a result, the halftone variation is "smoothed out", which provides a better starting point for the statistics collection.

The apparatus and method of the invention can also be applied to continuous tone images and it is not necessary to designate whether the original image is a halftone image, a continuous tone image or a combination of halftone and continuous tone images.

These and other features and advantages of this invention are described in or are apparent from the following detailed description of the preferred embodiments.

BRIEF DESCRIPTION OF THE DRAWINGS

The invention will be described in relation to the following drawings in which like reference numerals refer to like elements, and wherein:

FIG. 6 shows the product of the image densities and the corresponding filter weights for pixels (A)(1)–(G)(7) shown in FIG. 4 when the filter of FIG. 2 is centered over the pixel (D)(4);

FIG. 13 shows the product of the image densities and the corresponding filter weights for pixels (A)(1)–(O)(1) shown in FIG. 11 when the filter of FIG. 9 is centered over the pixel (H)(1);

DETAILED DESCRIPTION OF PREFERRED EMBODIMENTS

The system and method for automatic image enhancement of halftone images of this invention allows conventional automatic image enhancement methods, designed for continuous tone images, to be usable with scanned halftone images. U.S. Pat. Nos. 5,363,209, 5,371,615, 5,450,217, 5,450,502, 5,414,538, 5,347,374, 5,357,352, 5,045,952 and 5,581,370 and pending U.S. patent application Ser. No. 08/854,279, each assigned to the same assignee as this application and each incorporated herein by reference in its entirety, describe such continuous tone automatic image enhancement methods and systems that automatically enhance continuous tone images.

Thus, a detailed description of these continuous tone automatic image enhancement systems and methods will be omitted from the following description of the system and method according to this invention. However, it should be appreciated that once a scanned halftone image has been processed according to the system and/or method of this invention, any of the continuous tone automatic image enhancement systems and methods described above, and any other known or later developed continuous tone automatic image enhancement systems or methods, can be used with or applied to the resulting processed image.

Figure 1:
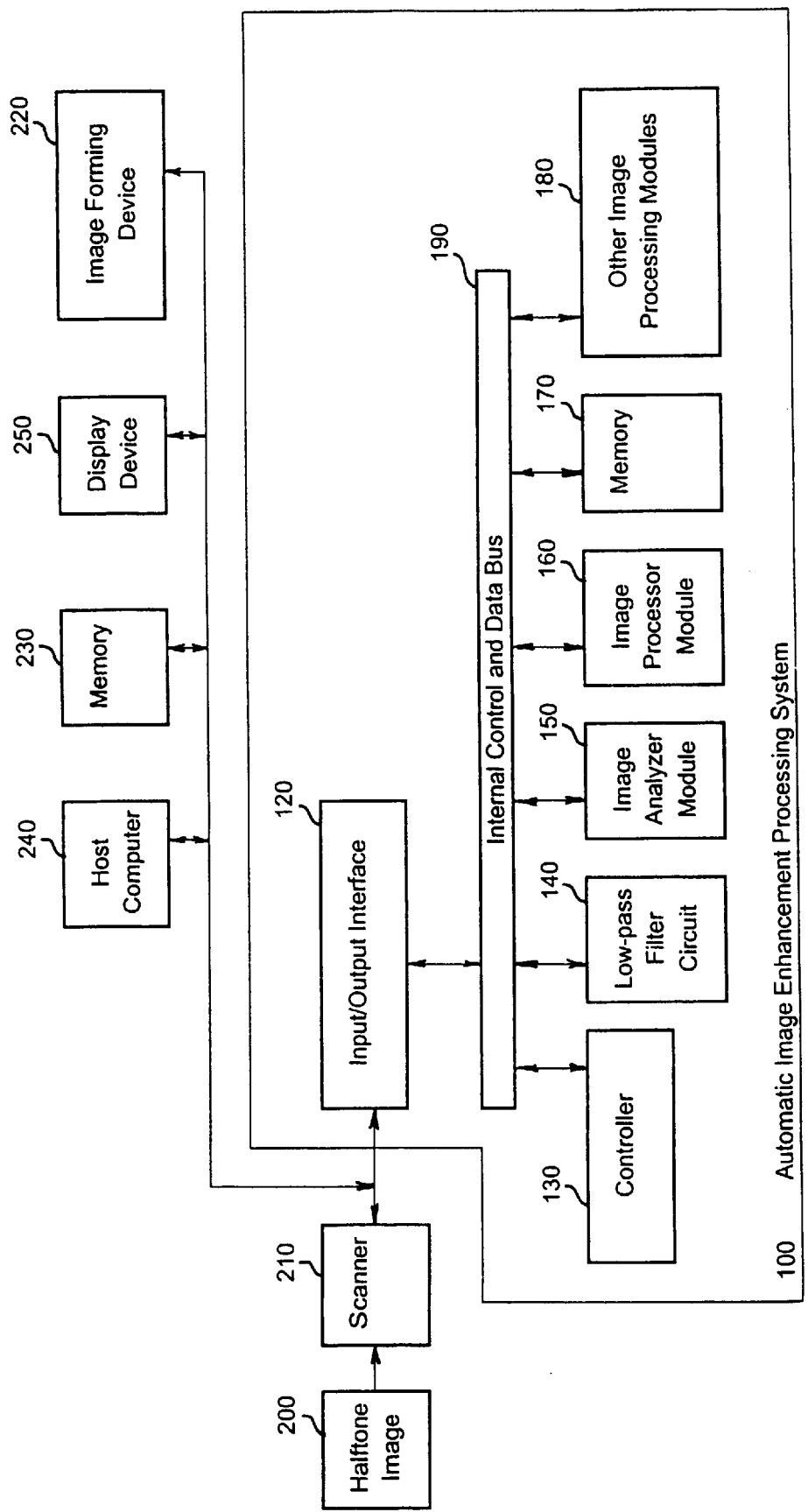
FIG. 1 is a block diagram of an automatic image enhancement system according to an embodiment of the invention.

FIG. 1 shows a functional block diagram of an automatic image enhancement processing system 100 according to this invention. As shown in FIG. 1, the automatic image enhancement processing system 100 includes an input/output interface 120, a controller 130, a low-pass filter circuit 140, an image analyzer module 150, an image processor module 160, a memory 170, and a block 180 representing any other image processing modules that may be implemented in the automatic image enhancement processing system 100 when programed to perform the automatic image enhancement processing system and method according to this invention. Each of the input/output interface 120, the controller 130, the low-pass filter circuit 140, the image analyzer and image processor modules 150 and 160, the memory 170, and the block 180 are connected by all internal control and data bus 190. A number of image data sources, such as a scanner 210, a host computer 240 and a memory 230, and a number of image data links, such as the host computer 240, the memory 230, an image forming device 220, and a display device 250 are connected to the automatic image enhancement processing system 100. Each of the scanner 210, the image forming device 220, the host computer 240, the memory 230, and the display device 250, are connected to the automatic image enhancement processing system 100 through the input/output interface 120.

In operation, a halftone image 200 formed on an image recording medium is scanned by the scanner 210 to generate electronic image data of the halftone image 200. Although this example uses a halftone original 200, the system can also be applied to a continuous tone image or a combination halftone/continuous tone image. The electronic image data representing the halftone image 200 is output from the scammer 210 to the input/output interface 120. The electronic image data representing the halftone image 200 received by the input/output interface 120, is transmitted under the control of the controller 130 over the data-control bus 190 to the memory 170. Once all of the electronic image data representing the halftone image 200 is stored in the memory 170, and any other desired pre-processing is applied to the electronic image data stored in the memory 170, blocks of the electronic image data surrounding a current pixel of interest are output to the low-pass filter circuit 140 on a pixel by pixel basis from the memory 170. However, it should be appreciated that the electronic image data representing the halftone image 200 can be directly input to the low-pass filter circuit 140 from the input/output interface 120. The low-pass filter circuit 140 "smoothes out" the electronic image data by eliminating the high frequency components of the electronic image data. The smoothed electronic image data output from the low-pass filter circuit 140 is input to the memory 170 where it is stored separately from the original electronic image data representing the halftone image 200. The smoothed electronic image data stored in the memory 170 is then output to the image analyzer module 150, where it is analyzed by the image analyzer module 150 to determine what, if any, processing should be performed on the original electronic image data. It should also be appreciated that the smoothed electronic image output from the low-pass filter circuit 140 can also be directly input to the image analyzer module 150.

After analysis, or statistics collection, by the image analyzer module 150, the original electronic image data is processed by the image processor module 160 based on the results of the analysis performed by the image analyzer module 150. Both the image analyzer module 150 and the image processor module 160 perform functions well known in the art, such as the various automatic image enhancement processes disclosed in the incorporated patents and applications. The processed electronic image data output from the image processor module 160 can be output to the image forming device 220, the other image processing modules represented by the blocks 180, and/or the memory 170.

It should be appreciated that the sampled image automatic image enhancement system 100 shown in FIG. 1 is preferably implemented using a general purpose computer. However, the sampled image automatic image enhancement system 100 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 16, can be used to implement the sampled image automatic image enhancement system 100.

It should further be appreciated that the sampled image automatic image enhancement system 100 can be incorporated into the image forming device 220 or the scanner 210, such as incorporating the sampled image automatic image enhancement system 100 into a scanner, a facsimile device, a digital photocopier or a printer. In the first case, a previously sampled halftone image may be received by the low-pass filter from the memory 230 or the host computer 240. For example, the host computer 240 may be a remotely located personal computer connected to the sampled automatic image enhancement system 100 over a local area network, a wide area network, an intranet, the Internet or any other distributed processing and storage network. Similarly, the memory 230 may be a memory of a remotely located server connected to the sampled image automatic image enhancement system 100 over a local area network, a wide area network, an intranet, the Internet or any other distributed processing and storage network.

In the second case, the processed halftone image output by the sampled image automatic image enhancement system 100 may be output to the host computer 240, the memory 230 and/or the display 250. Each of these devices may be connected to the sampled image automatic image enhancement system 100 over a local area network, a wide area network, an intranet, the Internet or any other distributed processing and storage network.

It should also be appreciated that the scanner 210, the sampled image automatic image enhancement system 100 and the image forming device 220 can be combined into a single device, such as a digital photocopier.

Figures 2, 3:
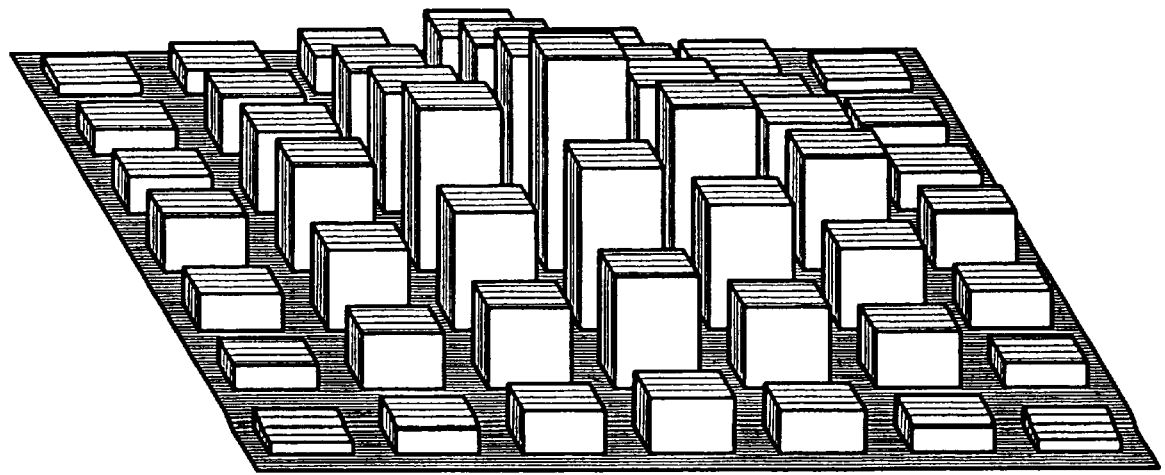
FIG. 2 illustrates an exemplary 7×7 pyramid low-pass filter.
FIG. 3 is a three-dimensional bar graph representing the weights of the filter shown in FIG. 2.

FIGS. 2 and 3 show one example of a 7×7 pyramid low-pass filter 300 that can be used in the invention. FIG. 2 shows the weight distribution of the filter 300. The center position of the filter 300 is weighted with a value of 16 and each of the corner positions of the filter 300 are weighted with a value of 1. The values of the remaining positions change smoothly. FIG. 3 is a three-dimensional bar graph representing the weight distribution of the filter 300 shown in FIG. 2. The weight distribution of the 7×7 filter shown in FIGS. 2 and 3 is only an example of one appropriate filter usable with the automatic image enhancement system 100 of this invention. Other low-pass filters of different dimensions and different weights can be appropriately used in the system and method of this invention.

Figures 4, 5:
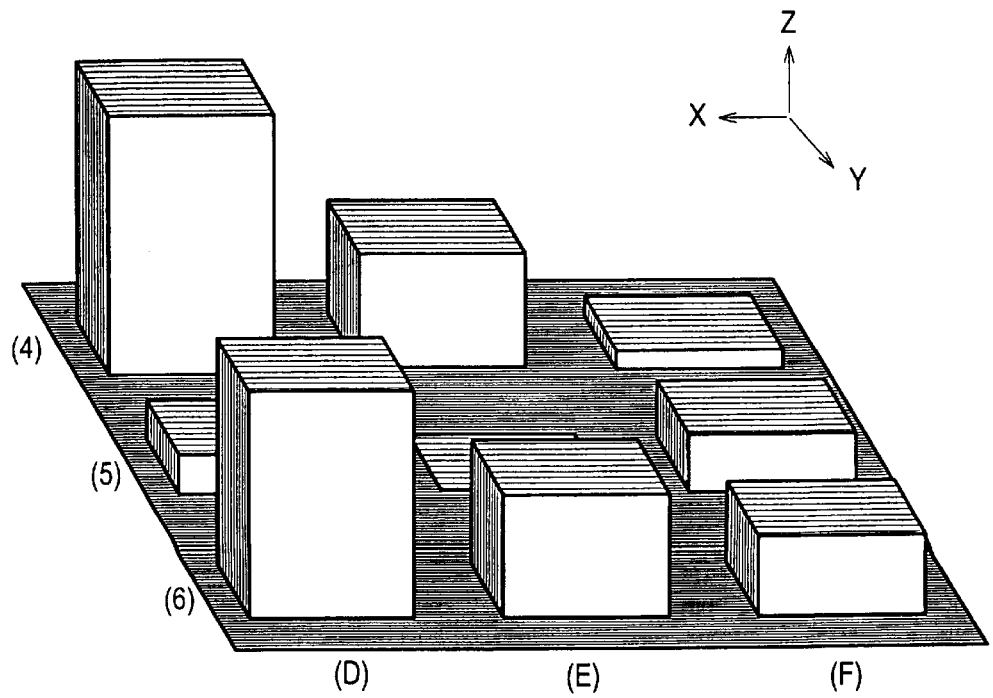
FIG. 4 shows a portion of an exemplary scanned halftone image having 81 pixels and the scanned image density of each pixel.
FIG. 5 is a three-dimensional bar graph representing the image densities of pixels (D)(4)–(F)(6) shown in FIG. 4.

FIG. 4 shows a portion of an exemplary scanned halftone image having 81 pixels referenced by column designators (A)–(I) and row designators (1)–(9). The number in each pixel represents the image density of that pixel. In this example, the image density of each pixel is in the range of 0–255. FIG. 5 is a three-dimensional bar graph representing the image densities of pixels (D)(4)–(F)(6) within the box 310 of FIG. 4.

In applying the 7×7 filter 300 to the image data of the halftone image, the filter 300 is successively centered on each pixel of the image. For example, the value of pixel (D)(4) after filtering is determined by centering the filter 300 on the pixel (D)(4) so that the filter 300 covers pixels (A)(1)–(G)(7). The image density of each pixel (A)(1)–(G)(7) is then multiplied by the corresponding filter weight. For example, the image density of pixel (A)(1), 234, is multiplied by 1, the image density of pixel (B)(1), 220, is multiplied by 2, the image density of pixel (B)(2), 210, is multiplied by 4 and the image density of pixel (D)(4), 180, is multiplied by 16. FIG. 6 shows the resulting weighted image densities for all 49 pixels (A)(1)–(G)(7). The sum of the 49 weighted image densities shown in FIG. 6 is then divided by the sum of the 49 weights of the 7×7 pyramid filter 300 shown in FIG. 2 to determine a resulting image density after filtering for the pixel (D)(4). For the 7×7 pyramid filter used in this example, the sum of the filter weights is 256. The sum of the 49 weighted image densities shown in FIG. 6 is 14,113. Therefore, the resulting image density after filtering for pixel (D)(4) equals 55 (14,113 divided by 256).

Figures 7, 8:
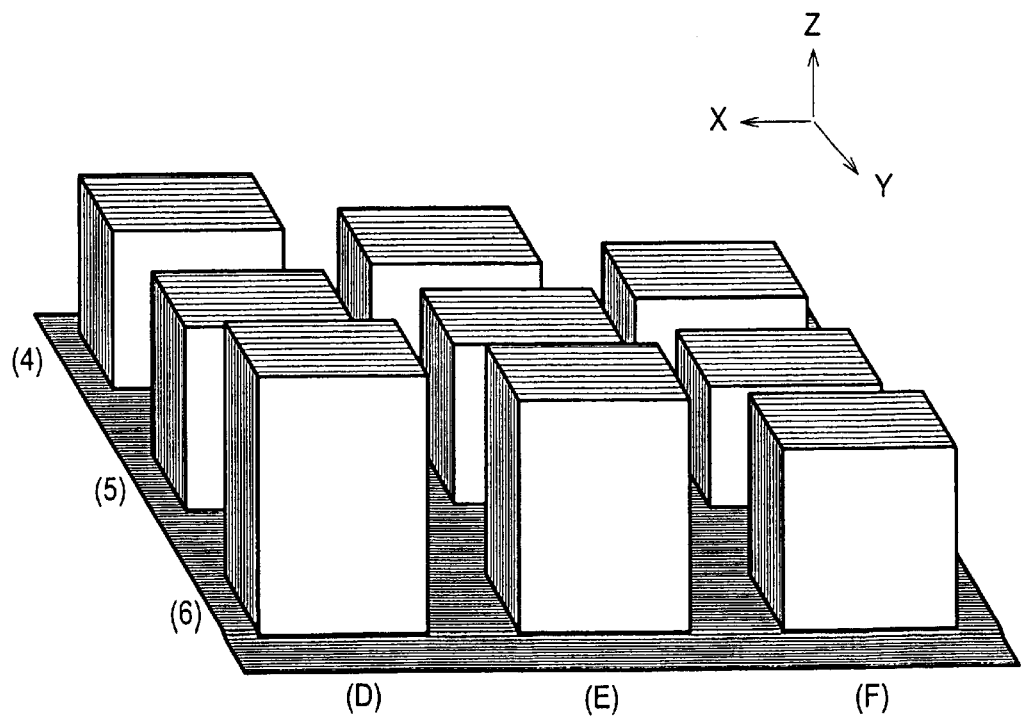
FIG. 7 shows the resulting image densities for pixels (D)(4)–(F)(6) after filtering.
FIG. 8 is a three-dimensional bar graph representing the resulting image density of pixels (D)(4)–(F)(6) shown in FIG. 7.

FIG. 7 shows the same sample image area shown in FIG. 4 after applying the 7×7 low-pass filter 300 shown in FIG. 2. The box 320 of FIG. 7 contains pixels (D)(4)–(F)(6). FIG. 7 shows only the resulting image densities after filtering of pixels (D)(4)–(F)(6). When an actual image is filtered, the 7×7 low-pass filter 300 is applied to all of the pixels of the image, except for the outermost three rows and three columns of pixels along each edge of the image.

FIG. 8 is a three-dimensional bar graph representing the resulting image density, after filtering pixels (D)(4)–(F)(6), within the box 320 shown in FIG. 7. FIG. 8 corresponds to FIG. 5, in that FIG. 5 shows the image densities of pixels (D)(4)–(F)(6) before filtering, while FIG. 8 shows the image densities of the same image pixels after filtering. FIG. 8 shows a smoother transition between image pixels, due to smaller differences between adjacent pixels, than does FIG. 5. For example, the difference between the image densities of pixels (D)(4) and (D)(5) in FIGS. 4 and 5 is 155 (180-25) whereas the corresponding difference in FIGS. 7 and 8 is 10 (55-65).

Figure 9:
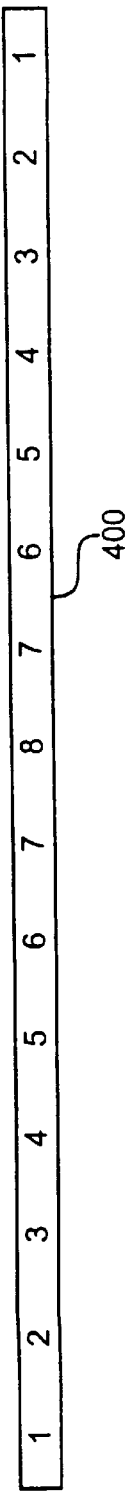
FIG. 9 illustrates an exemplary 15×1 triangular low-pass filter.
Figure 10:
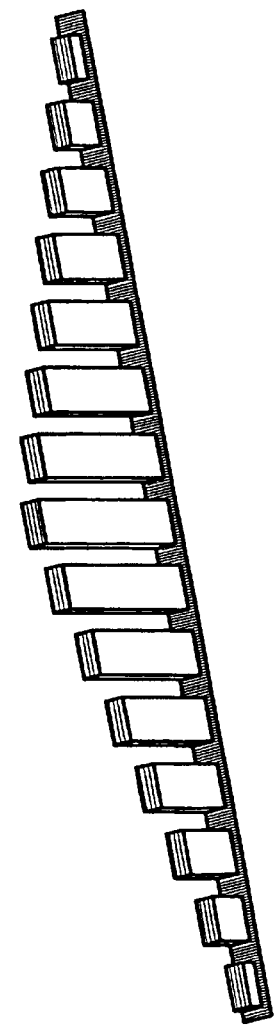
FIG. 10 is a three-dimensional bar graph representing the weights of the filter shown in FIG. 9.

As discussed above, a one-dimensional filter 400 may also be used in the invention. FIGS. 9 and 10 show one example of a 15×1 low-pass filter 400. FIG. 9 shows the weight distribution of the filter 400. The center position of the filter 400 is weighted with a value of 8 and each of the end positions of the filter 400 are weighted with a value of 1. The values of the remaining positions change smoothly. FIG. 10 is a three-dimensional bar graph representing the weight distribution of the filter shown in FIG. 9. The weight distribution of the 15×1 filter 400 shown in FIGS. 9 and 10 is only an example of one appropriate filter 400. Other low-pass filters 300 and 400 of different dimensions and different weights can be appropriately used in the system and method of this invention.

Figures 11, 12:
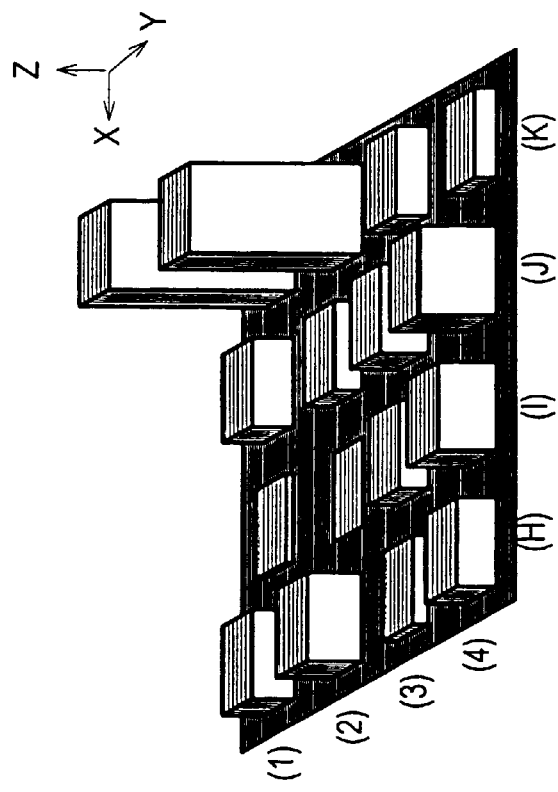
FIG. 11 shows a portion of an exemplary scanned halftone image having 72 pixels and the image density of each pixel.
FIG. 12 is a three-dimensional bar graph representing the image densities of pixels (H)(1)–(K)(4) shown in FIG. 11.

FIG. 11 shows a portion of an exemplary scanned halftone image having 72 pixels referenced by column designators (A)–(R) and row designators (1)–(4). Similarly to FIG. 4, the number in each pixel represents the image density of that pixel. In this example, the image density of each pixel is in the range of 0–255. FIG. 12 is a three-dimensional bar graph representing the image densities of pixels (H)(1)–(K)(4) within the box 410 in FIG. 11.

The one-dimensional filter 400, in this example a 15×1 filter 400, is applied to the image in a similar manner as the two-dimensional filter 300 discussed above. FIG. 13 corresponds to FIG. 6 in that it shows the product of the image density of a pixel and the corresponding filter weight for each of the 15 pixels processed in one application of the 15×1 filter 400. The image density after filtering of, for example, the pixel (H)(1), is determined by dividing the sum of the 15 weighted image densities shown in FIG. 13 by the sum of the filter weights of the 15×1 filter 400 shown in FIG. 9. In this example, the resulting image density after filtering for pixel (H)(1) is 79 (5,029 divided by 64).

Figures 14, 15:
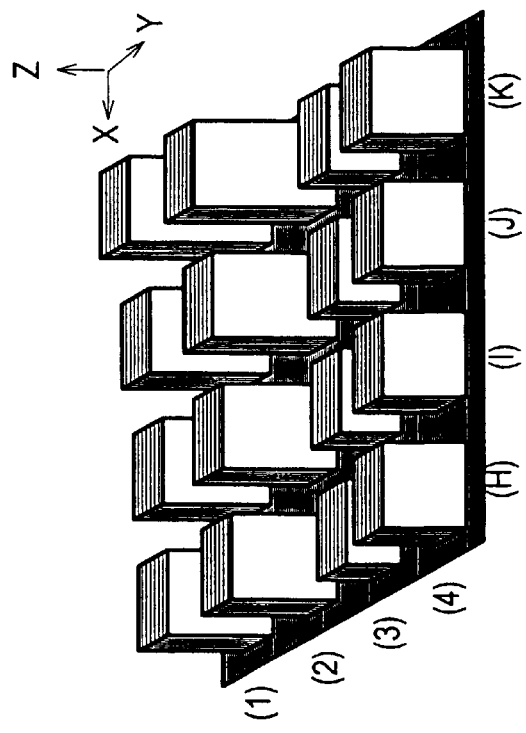
FIG. 14 shows the resulting image densities for pixels (H)(1)–(K)(4) after filtering.
FIG. 15 is a three-dimensional bar graph representing the resulting image densities of pixels (H)(1)–(K)(4) shown in FIG. 14.

FIG. 14 shows, in box 420, the image density after filtering of pixels (H)(1)–(K)(4). FIG. 15 is a three-dimensional bar graph representing the resulting image density after filtering of pixels (H)(1)–(K)(4) within the box 420 shown in FIG. 14.

A comparison of FIGS. 5 and 8 shows the smoothing effect of the two-dimensional pyramid filter. Before filtering, FIG. 5 shows large differences in image density between adjacent pixels. In contrast, after filtering, FIG. 8 shows much smaller differences in the image density between adjacent pixels. A comparison of FIGS. 12 and 15 shows a somewhat similar smoothing effect as explained above in reference to FIGS. 5 and 8. However, because FIGS. 12 and 15 correspond to the use of a one-dimensional filter, the smoothing of the image density of pixels is only along one direction (the x direction in FIG. 15). Because FIG. 8 corresponds to the use of a two-dimensional filter, smoothing takes place in both the x and y directions in FIG. 8.

By smoothing, i.e., decreasing the difference between the image densities of any two adjacent pixels in the image, low-pass filter 300 or 400 creates a filtered image that is more like a contone image than the original halftone image before filtering. Because it is more like a contone, the filtered image is usually a better input image for image analysis than is the halftone before filtering.

Figure 16:
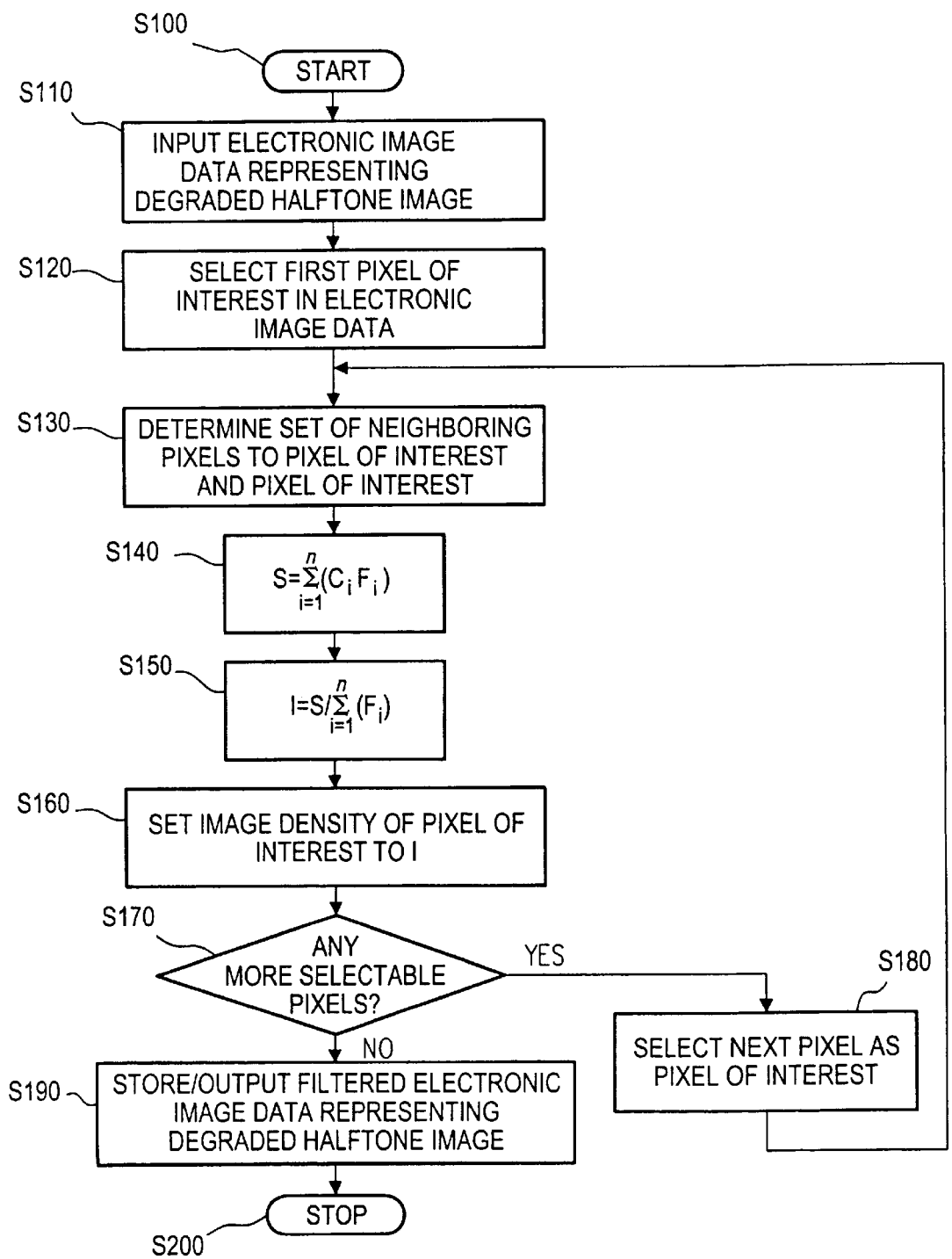
FIG. 16 is a flowchart outlining one embodiment of the halftone image automatic image enhancement method according to this invention.

FIG. 16 is a flow chart outlining one method for preparing a scanned halftone image for automatic image enhancement according to this invention. Starting at step S100, control continues to step S110, where the electronic image data representing the degrading halftone image is input. Next, in step S120, a first pixel of interest is selected from the electronic image data input in step S110. Then, in step S130, a set of pixels is determined that includes the pixel of interest and pixels neighboring the pixel of interest. Control then continues to step S140.

In step S140, the image density $C_i$ of each pixel in the set of pixels determined in step S130 is multiplied by a filter weight $F_i$ corresponding to the spatial position of that pixel relative to the pixel of interest. A sum S is then set equal to the sum of these products. Next, in step S150, an image density I is set equal to the sum S divided by the sum of the filter weights $F_i$. Then, in step S160, the image density of the pixel of interest is set equal to I. Control then continues to step S170.

In step S170, the control system determines if there are any more pixels that need to be filtered. If there are more pixels to be filtered, control continues to step S180. Otherwise control jumps to step S190.

In step S180, a next pixel is selected as the pixel of interest. Control then jumps back to step S130. In step S190 the filtered electronic image data representing the degraded halftone image is stored and/or output. Then, in step S200, the process stops.

Figures 17, 18, 19:
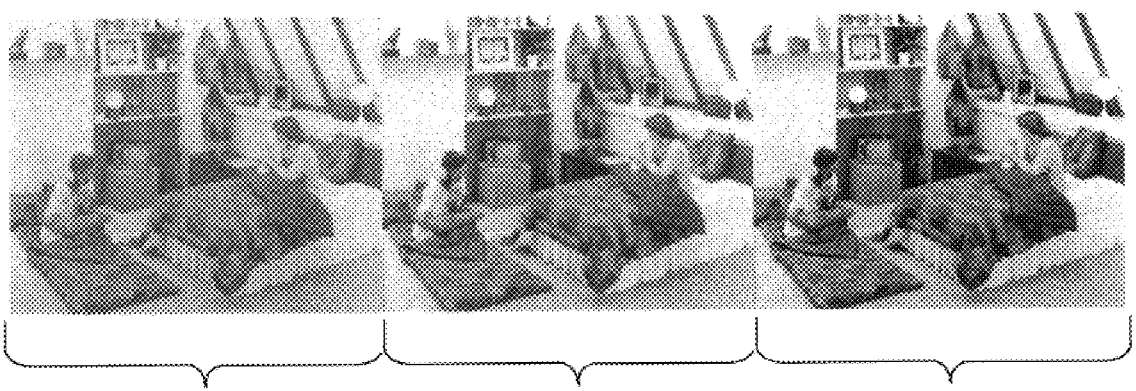
FIG. 17 is an example of a halftone image before automatic image enhancement.
FIG. 18 is an example of the halftone image shown in FIG. 17 after automatic image enhancement without using a low-pass filter and method according to this invention.
FIG. 19 is an example of the halftone image shown in FIG. 17 after automatic image enhancement in accordance with the invention.

Automatic image enhancement of degraded halftone images according to the invention results in an improved halftone image compared to the original degraded halftone image and/or the original degraded halftone image after conventional automatic image enhancement. FIG. 17 shows an original halftone image. FIG. 18 shows the image of FIG. 17 after automatic image enchancement without using a low-pass filter according to this invention. FIG. 19 shows the image of FIG. 17 after automatic image enhancement using a low-pass filter according to this invention. The improvement in image quality that results from using low-pass filtering according to this invention is apparent from a comparison of FIGS. 18 and 19. Although a benefit of the invention is shown using a monochrome halftone image as an example, it should be recognized that the invention can also be applied to multicolor halftone images and continuous tone images.

While the invention has been described in conjunction with the specific embodiments outlined above, it is evident that many alternatives, modifications and variations will be apparent to those skilled in the art. Accordingly, the preferred embodiments of the invention as set forth above are intended to be illustrative and not limiting. Various changes may be made without departing from the spirit and scope of the invention as defined herein.

What is claimed is:

1. An image processing apparatus comprising:
    a low-pass filter that inputs a halftone image on a pixel-by-pixel basis, the halftone image having a plurality of pixels arranged in two dimensions, each pixel having an image density and a plurality of neighboring pixels, and that outputs a filtered halftone image;
    an image analyzer that analyzes the filtered halftone image and produces at least one analysis of the filtered halftone image; and
    an image processor that inputs the at least one analysis and the input halftone image and that produces a processed halftone image having at least a portion processed based on the at least one analysis.

2. The image processing apparatus of claim 1, wherein the low-pass filter comprises:
    a circuit that multiplies, for each of a current pixel and a number of neighboring pixels, an image density of that pixel by a corresponding weight of the low-pass filter;
    a circuit that sums the product of the multiplication of the image densities and the corresponding weights of the current pixel and the number of neighboring pixels, and
    a circuit that divides the sum by a sum of the weights of the low-pass filter.

3. The image processing apparatus of claim 1, wherein the low-pass filter is a two-dimensional filter.

4. The image processing apparatus of claim 3, wherein the low-pass filter is a two-dimensional pyramid filter.

5. The image processing apparatus of claim 4, wherein the low-pass filter is a 7×7 two-dimensional pyramid filter weighted as follows:

$$\begin{bmatrix} 1 & 2 & 3 & 4 & 3 & 2 & 1 \\ 2 & 4 & 6 & 8 & 6 & 4 & 2 \\ 3 & 6 & 9 & 12 & 9 & 6 & 3 \\ 4 & 8 & 12 & 16 & 12 & 8 & 4 \\ 3 & 6 & 9 & 12 & 9 & 6 & 3 \\ 2 & 4 & 6 & 8 & 6 & 4 & 2 \\ 1 & 2 & 3 & 4 & 3 & 2 & 1 \end{bmatrix}.$$

6. The image processing apparatus of claim 1, wherein the low-pass filter is a one-dimensional filter.

7. The image processing apparatus of claim 6, wherein the low-pass filter is a 15×1 one-dimensional filter weighted as follows:

[1 2 3 4 5 6 7 8 7 6 5 4 3 2 1].

8. The image processing apparatus of claim 1, wherein the image processor selectively processes a portion of the input halftone image based on the output of the image analyzer.

9. The image processing apparatus of claim 1, wherein the image processing apparatus is one of a scanner; a printer; a photocopier; or a facsimile machine.

10. A method for processing a halftone image on a pixel-by-pixel basis, the halftone image having a plurality of pixels arranged in two dimensions, each pixel having an image density and a plurality of neighboring pixels, the method comprising:
    filtering the halftone image on a pixel-by-pixel basis with a low-pass filter;
    analyzing the filtered halftone image to generate at least one analysis of the filtered halftone image; and
    processing the halftone image to produce a halftone image based on the at least one analysis.

11. The method of claim 10, wherein filtering the image density of the first pixel comprises, for a current pixel of the halftone image:
    selecting a plurality of pixels located at predetermined spatial positions around the current pixel, the plurality of selected pixels including the current pixel;
    multiplying, for each of the plurality of selected pixels, the image density of that pixel by a weight corresponding to the predetermined spatial position of that pixel;
    summing the weighted image densities of the plurality of selected pixels; and
    dividing the sum of the weighted image densities by a sum of the weights corresponding to the predetermined spatial positions.

12. The method of claim 11, wherein the predetermined spatial positions extend around the current pixel in two dimensions.

13. The method of claim 12, wherein the weights corresponding to the two-dimensional predetermined spatial positions are pyramidal.

14. The method of claim 12, wherein the two-dimensional predetermined spatial positions form a 7×7 square centered on the current pixel.

15. The method of claim 14, wherein the weights of the 7×7 square are:

$$\begin{bmatrix} 1 & 2 & 3 & 4 & 3 & 2 & 1 \\ 2 & 4 & 6 & 8 & 6 & 4 & 2 \\ 3 & 6 & 9 & 12 & 9 & 6 & 3 \\ 4 & 8 & 12 & 16 & 12 & 8 & 4 \\ 3 & 6 & 9 & 12 & 9 & 6 & 3 \\ 2 & 4 & 6 & 8 & 6 & 4 & 2 \\ 1 & 2 & 3 & 4 & 3 & 2 & 1 \end{bmatrix}.$$

16. The method of claim 11, wherein the predetermined spatial positions extend around the current pixel in one dimension.

17. The method of claim 16, wherein the weights corresponding to the one-dimensional predetermined spatial positions are triangular.

18. The method of claim 16, wherein the one-dimensional predetermined spatial positions extend 15 pixels centered on the current pixel.

19. The method of claim 18, wherein the weights of the 15 pixels are:

[1 2 3 4 5 6 7 8 7 6 5 4 3 2 1].

20. The method of claim 10, wherein a portion of the halftone image is selectively processed based on results of the image analysis.

21. An image processing apparatus comprising:
means for inputting electronic image data defining a halftone image, the halftone image having a plurality of pixels, each pixel having an image density and a plurality of neighboring pixels;
means for low-pass filtering the halftone image on a pixel-by-pixel basis and for producing a filtered halftone image;
means for analyzing the filtered halftone image and for producing at least one analysis of the filtered halftone image; and
processing means for inputting the at least one analysis and for producing a processed halftone image having at least a portion processed based on the at least one analysis.

22. The image processing apparatus of claim 21, wherein the means for low-pass filtering comprises:
means for multiplying, for each of a current pixel and a number of neighboring pixels, an image density of that pixel by a corresponding weight of the low-pass filter to generate a product;
means for summing the products for the current pixel and the number of neighboring pixels to generate a first sum; and
means for dividing the first sum by a sum of the weights of the low-pass filter.

23. The image processing apparatus of claim 21, wherein the means for low-pass filtering includes a two-dimensional filter.

24. The image processing apparatus of claim 23, wherein the two-dimensional filter is a two-dimensional pyramid filter.

25. The image processing apparatus of claim 24, wherein the two-dimensional filter is a 7×7 two-dimensional pyramid filter weighted as follows:

$$\begin{bmatrix} 1 & 2 & 3 & 4 & 3 & 2 & 1 \\ 2 & 4 & 6 & 8 & 6 & 4 & 2 \\ 3 & 6 & 9 & 12 & 9 & 6 & 3 \\ 4 & 8 & 12 & 16 & 12 & 8 & 4 \\ 3 & 6 & 9 & 12 & 9 & 6 & 3 \\ 2 & 4 & 6 & 8 & 6 & 4 & 2 \\ 1 & 2 & 3 & 4 & 3 & 2 & 1 \end{bmatrix}.$$

26. The image processing apparatus of claim 21, wherein the means for low-pass filtering includes a one-dimensional filter.

27. The image processing apparatus of claim 26, wherein the one-dimensional filter is a 15×1 one-dimensional filter weighted as follows:

[1 2 3 4 5 6 7 8 7 6 5 4 3 2 1].

28. The image processing apparatus of claim 21, wherein the processing means selectively processes a portion of the halftone image based on the output of the image analyzer.

29. The image processing apparatus of claim 21, wherein the image processing apparatus is one of a scanner; a printer; a photocopier; or a facsimile machine.

* * * * *